Aug. 24, 1943.    R. STEVENSON ET AL    2,327,830
LOADING VALVE
Filed Sept. 18, 1942
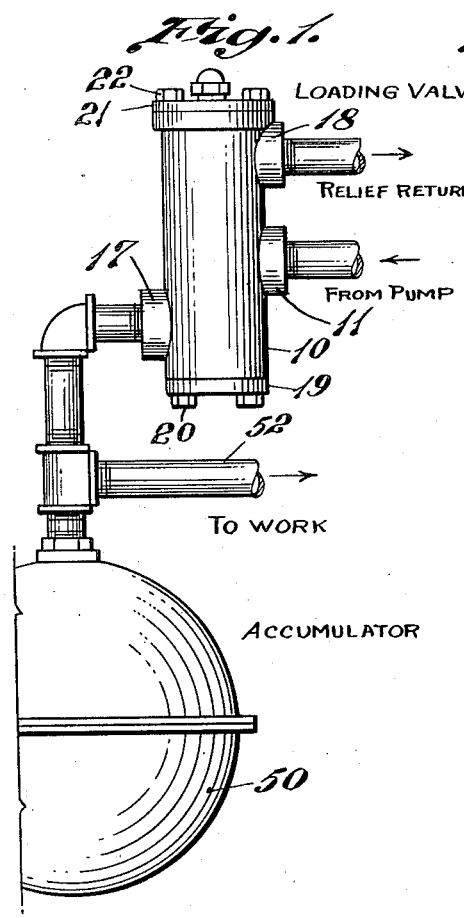
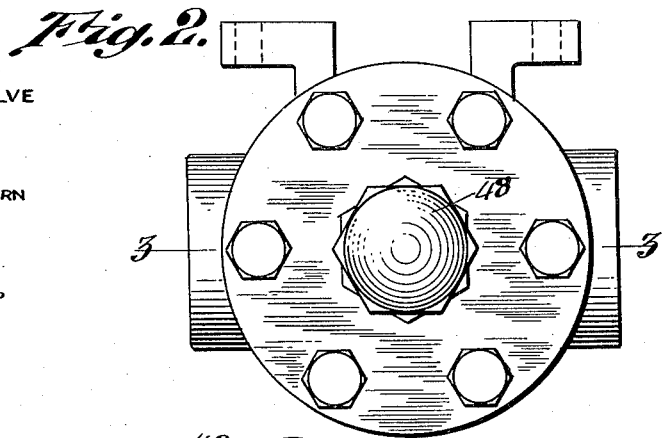
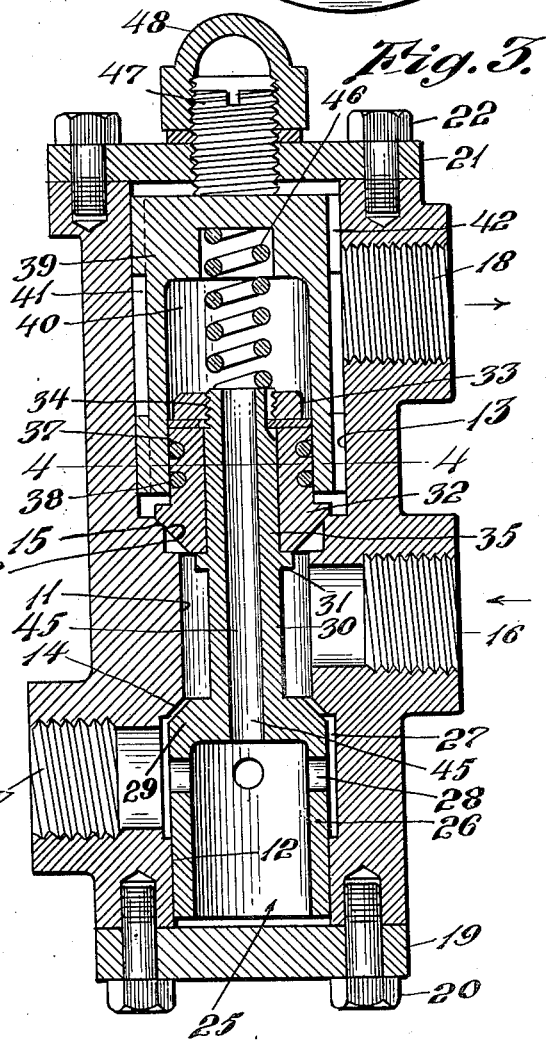
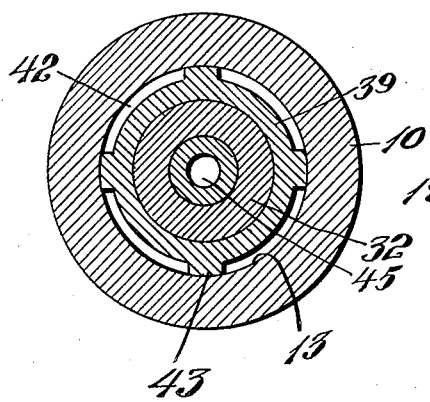
INVENTORS
Robert Stevenson
Alexander W. Keema
BY Barlow & Barlow
ATTORNEYS Patented Aug. 24, 1943

2,327,830

UNITED STATES PATENT OFFICE 2,327,830

LOADING VALVE

Robert Stevenson and Alexander W. Keema, Providence, R. I., assignors to Merit Engineering, Inc., a corporation of Rhode Island Application September 18, 1942, Serial No. 458,901

5 Claims. (Cl. 137—153)

This invention relates to a loading valve for storing fluid under pressure in an accumulator from which a work unit is supplied.

It is quite usual in a valve of this character to provide a movable element in the shape of a sphere or ball which is pressed by a spring in one direction, the spring exerting all of the force used for moving the ball to closed position. Such an arrangement often causes indentations in the ball due to the action of the spring on it or extensive wear on the ball at its seating area.

One of the objects of this invention is to provide a valve in which a relatively light spring may be utilized and the pressure of the fluid which is controlled used to balance or partially balance the operating plunger, reducing the wear from the spring pressure to a minimum.

Another object of this invention is to provide a plunger which will be well guided and an arrangement of body and operating parts which will be extremely simple and inexpensive to manufacture.

With these and other objects in view, the invention consists of certain novel features of construction, as will be more fully described and particularly pointed out in the appended claims.

In the accompanying drawing:

Fig. 1 is an elevation illustrating the loading valve as connected to an accumulator and the different leads to and from the valve and the accumulator which occur in the hook-up of the device;

Fig. 2 is a top plan view of the valve;

Fig. 3 is a central sectional view on line 3—3 of Fig. 2;

Fig. 4 is a section on line 4—4 of Fig. 3.

In proceeding with this invention the plunger which is provided has portions to engage two valve seats, there being an inlet port between these valve seats and outlet ports one or either side of the two valve seats. The arrangement is such that when the plunger moves in one direction its area which contacts one valve seat shuts off communication to one outlet port while at the same time opening communication to the other outlet port. When the plunger moves in the opposite direction the reverse is true in that communication is shut off from one outlet port and established with the other outlet port. In order that this plunger may be easily operated and controlled by a light spring we have provided an axial conduit through the plunger and we have formed a separate chamber embracing one end of the plunger and separating it from one outlet port so that the same fluid pressure has access to the opposite ends of the plunger and then by controlling the areas of the opposite ends of the plunger by the assistance of a light spring we are able to determine the pressure at which the plunger will move in one direction or the other.

With reference to the drawing, 10 designates the body which as illustrated may be in the form of a one-piece casting providing with a central bore 11, a larger bore 12 extended inwardly from one end and a still larger bore 13 extending inwardly from the other end. The shoulder provided between the bores 11 and 12 is surfaced as at 14 to provide one valve seat while a shoulder provided between the bores 11 and 13 is surfaced to provide the other valve seat 15.

The inlet port is designated 16 and extends into the body to communicate with the chamber 11 between the valve seats while there is an outlet port 17 connected to the accumulator and located on the opposite side of the valve seat 14 communicating with the chamber 12 and an outlet port connected to the relief return and designated 18 and located on the opposite side of the valve seat 15 and communicating with the chamber 13.

An end wall 19 is bolted to the body as at 20 while the opposite end wall 21 is bolted to the body as at 22. The plunger designated generally 25 has an enlarged portion 26 having a sliding guiding fit in the bore 12, the plunger being generally in the shape at this location of an inverted cup, with holes 28 communicating with the enlarged portion 27 of the bore which enlargement is at the location of the outlet opening 17. At the upper end of this inverted cup-like portion 26 there is a surface 29 which has a sealing engagement with the seat 14 so that when the plunger is moved to cause engagement at this point, communication between the inlet port 16 and the outlet port 17 is shut off.

The plunger has a reduced portion 30 at a location opposite the inlet port 16 and then this plunger is enlarged to provide an abutment 31 for the reception of the head 32 of this plunger which is integrally assembled with the plunger and which head is held against the abutment 31 by a nut 33 having threaded engagement as at 34 with the stem 35 of the plunger. This head is provided with a beveled area 36 which engages the seat 15 and when in engagement with this seat closes communication between the inlet port 16 and the outlet port 18. This part 32 of the plunger is also provided with recesses 37 to receive packing or rings 38 providing a piston-like head which has guiding and sliding fit within the inverted cup-like cylinder 39 to provide a chamber 40 in which this piston-like head of the plunger operates. This inverted cup-like cylinder 39 may slide in the bore 13 and is guided in its movement by the bore 13 while it in turn is slidably engaged by and provides a guide for the head of the plunger. This cylinder 39 is reduced in diameter as at 41 and is provided with a plurality of grooves 42 and ribs 43 at either end so as to provide free communication between the inlet port 16 and the outlet port 18 while separating the fluid between the inlet ports 16 and outlet ports 17 from communication with the upper end of the plunger.

A conduit 45 extending from one end of the plunger to the other end is provided so that the fluid communicating with the outlet port 17 has access to both ends of the plunger and thus the unit area force exerted on both ends of the plunger will be the same. But, inasmuch as the diameter and area of the portion 26 of the plunger is greater than the diameter and area of the opposite end of the plunger there is a differential between these and the plunger would be so pressed by the fluid as to cause contact with its seat 14. To control this action we have provided a spring 46 located between the inner surface of the chamber 40 and the upper end or head of the plunger which may be adjusted by movement of the cup member 39 by the screw 47 acting through the end wall 21 so that until a certain predetermined pressure is built up in the outlet 17 the spring will overcome the differential between the areas at the opposite ends of the plunger against which the fluid pressure communicating with the outlet ports 17 presses. For instance, I may desire to provide in the accumulator 50 (see Fig. 1) a pressure of 500 pounds for supplying work through a conduit 52. Accordingly the spring 46 will be set by adjustment 47 so that the plunger will remain in the position shown in the drawing until the predetermined pressure of 500 pounds is built up and at this point the differential in area at the opposite ends of the plunger will be such as to overcome the pressure of the spring and then the plunger will move inwardly to close its portion 29 against the surface 14 and shut off communication between inlet port 16 and outlet port 17 but will open communication to the port 18 by surface 36 of the plunger moving away from the valve seat 16 and then the pump will merely circulate the fluid through the valve in a closed cycle so long as the pressure in the accumulator remains at this 500 pounds. If the accumulator is drawn upon for work and the pressure drops, then the spring will overcome the differential in the areas at the ends of the plunger and move the plunger to the position shown in Fig. 3 which will remain in such position until the pressure is again built up to 500 pounds when any excess will then again move the plunger up and this closed cycle mentioned will be repeated. The action occurs each time the accumulator drops below the amount at which the arrangement is set for. A cap 48 covers the adjusting screw 47 when it is required that adjustment be made.

The valve is composed of a minimum number of parts the body being one integral casting, the valve seats both being accessible through the end walls. The plunger although provided with a separate chamber at one end for assisting in the fluid control action thereof is well guided in its actions by reason of the bores extending inwardly from the opposite ends thus providing a most simple construction and yet one which is assisted in its control by the pressure which would require but a very light spring with the minimum of wear for operating the plunger to and from its operating positions.

We claim:

1. In a loading valve, a body provided with a pair of oppositely facing valve seats, said body being provided with an inlet port communicating with the body between said valve seats, outlet ports one on either side of the pair of valve seats, a plunger in said body provided with a surface to engage one seat upon movement in one direction and a surface to engage the other seat upon movement in the other direction to control the outlet ports communicating with the inlet port, and means for exposing the opposite ends of the plunger to the same fluid pressure, said plunger presenting different diameters to said fluid pressure and controllable resilient means pressing on the plunger end of lesser diameter to assist the plunger in its action.

2. In a loading valve, a body provided with a pair of oppositely facing valve seats, said body being provided with an inlet port communicating with the body between said valve seats, outlet ports one on either side of the pair of valve seats, a plunger in said body provided with a surface to engage one seat upon movement in one direction and a surface to engage the other seat upon movement in the other direction to control the outlet ports communicating with the inlet port, means including an axial opening through said plunger for exposing the opposite ends of the plunger to the same fluid pressure, said plunger presenting different diameters to said fluid pressure and controllable resilient means pressing on the plunger end of lesser diameter to assist the plunger in its action.

3. In a loading valve, a body provided with a pair of oppositely facing valve seats, said body being provided with an inlet port communicating with the body between said valve seats, outlet ports one on either side of the pair of valve seats, a plunger in said body provided with a surface to engage one seat upon movement in one direction and a surface to engage the other seat upon movement in the other direction to control the outlet ports communicating with the inlet port, means including a chamber embracing one end of the plunger and separating it from communication with one outlet port for exposing the opposite ends of the plunger to the same fluid pressure, said plunger presenting different diameters to said fluid pressure and controllable resilient means pressing on the plunger end of lesser diameter to assist the plunger in its action.

4. In a loading valve, a body provided with a pair of oppositely facing valve seats, said body being provided with an inlet port communicating with the body between said valve seats, outlet ports one on either side of the pair of valve seats, a plunger in said body provided with a surface to engage one seat upon movement in one direction and a surface to engage the other seat upon movement in the other direction to control the outlet ports communicating with the inlet port, and means acting through said chamber for controlling said resilient means for exposing the opposite ends of the plunger to the same fluid pressure, said plunger presenting different diameters to said fluid pressure and controllable resilient means pressing on the plunger end of lesser diameter to assist the plunger in its action.

5. In a loading valve, a body provided with a pair of oppositely facing valve seats, said body being provided with an inlet port communicating with the body between said valve seats, outlet ports one on either side of the pair of valve seats, a plunger in said body provided with a surface to engage one seat upon movement in one direction and a surface to engage the other seat upon movement in the other direction to control the outlet ports communicating with the inlet port, a chamber embracing one end of the plunger and separating it from communication with one outlet port, said plunger having an axial opening therethrough communicating with said chamber and the other outlet port than the one from which it is separated whereby the fluid pressure has access to the opposite ends of the plunger, the diameter of the plunger in said chamber being less than the diameter of the opposite end of the plunger and a spring in said chamber to press upon that end of the plunger and move it to one of its seats until the pressure becomes such as to because of the differential of diameter move the plunger in the opposite direction to its other seat.

ROBERT STEVENSON.
ALEXANDER W. KEEMA.